US 8,738,070 B2

(12) United States Patent
Shindo

(10) Patent No.: US 8,738,070 B2
(45) Date of Patent: May 27, 2014

(54) WIRELESS COMMUNICATION SYSTEM, WIRELESS BASE STATION, WIRELESS COMMUNICATION METHOD, AND PROGRAM

(75) Inventor: Masato Shindo, Tokyo (JP)

(73) Assignee: NEC Corporation, Tokyo (JP)

( * ) Notice: Subject to any disclaimer, the term of this patent is extended or adjusted under 35 U.S.C. 154(b) by 389 days.

(21) Appl. No.: 13/262,956

(22) PCT Filed: Mar. 4, 2010

(86) PCT No.: PCT/JP2010/053523
§ 371 (c)(1),
(2), (4) Date: Oct. 5, 2011

(87) PCT Pub. No.: WO2010/125853
PCT Pub. Date: Nov. 4, 2010

(65) Prior Publication Data
US 2012/0040705 A1    Feb. 16, 2012

(30) Foreign Application Priority Data

Apr. 28, 2009    (JP) .................................. 2009-109285

(51) Int. Cl.
*H04B 7/00*    (2006.01)

(52) U.S. Cl.
USPC .......... 455/524; 455/525; 455/507; 455/3.01; 455/508; 455/514; 725/62; 725/67; 725/71; 370/310; 370/312; 370/343; 370/338; 370/329

(58) Field of Classification Search
USPC ......... 455/524, 525, 517, 500, 507, 508, 509, 455/514, 515, 3.01–3.06, 422.1, 403, 445, 455/414.1–414.4, 426.2, 561, 562.1, 550.1, 455/67.11, 423–425; 725/62–72; 370/310, 370/312, 328, 329, 343, 338
See application file for complete search history.

(56) References Cited

U.S. PATENT DOCUMENTS

2012/0002584 A1*    1/2012 Shimizu .................. 370/312

FOREIGN PATENT DOCUMENTS

| CN | 1620161 A | 5/2005 |
| CN | 101174969 A | 5/2008 |

(Continued)

OTHER PUBLICATIONS

International Search Report for PCT/JP2010/053523 mailed Apr. 13, 2010.

(Continued)

*Primary Examiner* — Keith Ferguson
(74) *Attorney, Agent, or Firm* — Sughrue Mion, PLLC

(57) ABSTRACT

Each of a plurality of wireless base stations includes: a storage unit that stores flag that indicates whether or not its own station is master base station; a determination unit that determines a wireless parameter set that is set in channels used for transmission of MBMS data; a notification unit that, when its own station is master base station, reports the wireless parameter set determined in the determination unit to other wireless base stations; an acquisition unit that, when its own station is not master base station, acquires a wireless parameter set reported from master base station; and a setting unit that, when its own station is master base station, sets the wireless parameter set determined in the determination unit in the channels; and when its own station is not master base station, sets the wireless parameter set acquired in the acquisition unit to the channels.

15 Claims, 3 Drawing Sheets

(56) References Cited

FOREIGN PATENT DOCUMENTS

| | | | |
|---|---|---|---|
| CN | 101742659 B | * | 7/2012 |
| JP | 2004236690 A | | 8/2004 |
| JP | 2005159545 A | | 6/2005 |
| JP | 2007502070 A | | 2/2007 |
| JP | 2007521777 A | | 8/2007 |
| JP | 2008136151 A | | 6/2008 |
| JP | 2008187552 A | | 8/2008 |
| JP | 2009049485 A | | 3/2009 |
| WO | 2008052958 A | | 5/2008 |
| WO | 2008137376 A | | 11/2008 |

OTHER PUBLICATIONS

Nokia Siemens Networks et al., "3GPP TR R3.022 v0.1.0: 3rd Generation Partnership Project, Technical Specification Group Radio Access Network; Enhancements for FDD HSPA Evolution; (Release 8)", Technical Report, 3GPP TSG-RAN WG3 Meeting #59bis, R3-080791, Mar. 2008. See cited doc on p. 1 of translated CNOA for explanation of relevance.

Chinese Office Action for CN Application No. 201080018816.7 issued on Oct. 23, 2013 with English Translation.

* cited by examiner

WIRELESS COMMUNICATION SYSTEM, WIRELESS BASE STATION, WIRELESS COMMUNICATION METHOD, AND PROGRAM

TECHNICAL FIELD

The present invention relates to a wireless communication system, a wireless base station, a wireless communication method, and a program.

BACKGROUND ART

In the 3GPP ($3^{rd}$ Generation Partnership Projects), services are prescribed that are referred to as MBMS (Multimedia Broadcast Multicast Services) (see Patent Documents 1 and 2).

MBMS is a service in which multimedia data such as moving pictures or music (hereinbelow referred to as MBMS data) are simultaneously transmitted by broadcast or multicast to a plurality of mobile stations.

In addition, a system referred to as an MBSFN (Multimedia Broadcast Single Frequency Network) is prescribed in 3GPP as a mode of offering MBMS.

An MBSFN is a mode in which each of a plurality of wireless base stations sets an identical wireless parameter set (such as frequency) in channels used in transmitting MBMS data in cells that are formed by these wireless base stations and transmits identical MBMS data to mobile stations.

Thus, as seen from mobile stations, a plurality of cells that are formed by each of a plurality of wireless base stations can be considered as one large communication area. This communication area is referred to as an MBSFN cluster.

In a W-CDMA (Wideband Code Division Multiple Access) wireless communication system, a wireless base station (NodeB) and Radio Network Controller (RNC) are typically split between different apparatuses.

As a result, when an MBMS is offered using an MBSFN in a W-CDMA wireless communication system, the radio network controller designates to wireless base stations, that are under its jurisdiction, wireless parameters that are to be used by the wireless base stations.

Coordination of wireless parameters can thus be established among wireless base stations and an MBSFN cluster can be formed that straddles a plurality of wireless base stations.

LITERATURE OF THE PRIOR ART

Patent Documents

Patent Document 1: JP 2007-502070 A
Patent Document 2: JP 2007-521777 A

SUMMARY OF THE INVENTION

Problem to be Solved by the Invention

Recently, there are wireless communication systems that are provided with femto wireless base stations (HNB: Home NodeB) as wireless base stations that have a small cell diameter.

However, because femto wireless base stations are of a configuration in which the functions of a radio network controller (RNC) have been degenerated to those of a wireless base station (NodeB), establishing coordination among femto wireless base stations is problematic and the problem therefore arises that an MBSFN cluster cannot be formed.

It is therefore an object of the present invention to provide a wireless communication system, a wireless base station, a wireless communication method, and a program that can solve the above-described problem.

Means for Solving the Problem

The wireless communication system of the present invention is a wireless communication system that includes a plurality of wireless base stations that transmit MBMS data to mobile stations within the cells of the wireless base stations, wherein each of the plurality of wireless base stations includes:

a storage unit that stores a flag that indicates whether or not its own wireless base station is a master base station;

a determination unit that, when its own wireless base station is a master base station, determines a wireless parameter set that is set in channels to be used for transmission of MBMS data;

a notification unit that, when its own wireless base station is a master base station, reports the wireless parameter set that was determined in the determination unit to other wireless base stations;

an acquisition unit that, when its own wireless base station is not a master base station, acquires a wireless parameter set that was reported from a master base station; and a setting unit that, when its own wireless base station is a master base station, sets the wireless parameter set that was determined in the determination unit to the channels, and when its own wireless base station is not the master base station, sets the wireless parameter set that was acquired in the acquisition unit in the channels.

The wireless base station of the present invention is a wireless base station that transmits MBMS data to mobile stations in the cell of the wireless base station and includes:

a storage unit that stores a flag that indicates whether or not its own wireless base station is a master base station;

a determination unit that, when its own wireless base station is a master base station, determines a wireless parameter set that is set to channels used for transmission of MBMS data;

a notification unit that, when its own wireless base station is a master base station, reports the wireless parameter set that was determined in the determination unit to other wireless base stations;

an acquisition unit that, when its own wireless base station is not a master base station, acquires the wireless parameter set that was reported from a master base station; and a setting unit that, when its own wireless base station is a master base station, sets the wireless parameter set that was determined in the determination unit ins the channels, and when its own wireless base station is not a master base station, sets the wireless parameter set that was acquired in the acquisition unit in the channels.

The wireless communication method of the present invention is a wireless communication method that is realized by a wireless base station that transmits MBMS data to mobile stations in the cell of its own wireless base station and includes:

a storage step of storing a flag that indicates whether or not its own wireless base station is a master base station;

a determination step of, when its own wireless base station is a master base station, determining a wireless parameter set that is set to channels used for transmission of MBMS data;

a notification step of, when its own wireless base station is a master base station, reporting the wireless parameter set that was determined in the determination step to other wireless base stations;

an acquisition step of, when its own wireless base station is not a master base station, acquiring a wireless parameter set that was reported from a master base station; and a setting step of, when its own wireless base station is a master base station, setting the wireless parameter set that was determined in the determination step in the channels, and when its own wireless base station is not a master base station, setting the wireless parameter set that was acquired in the acquisition step to the channels.

The program of the present invention causes a wireless base station that transmits MBMS data to mobile stations in the cell of its own wireless base station to execute:

a storage procedure of storing a flag that indicates whether or not its own wireless base station is a master base station;

a determination procedure of, when its own wireless base station is a master base station, determining a wireless parameter set that is set to channels used for transmission of MBMS data;

a notification procedure of, when its own wireless base station is a master base station, reporting the wireless parameter set that was determined in the determination procedure to other wireless base stations;

an acquisition procedure of, when its own wireless base station is not a master base station, acquiring a wireless parameter set that was reported from a master base station; and a setting procedure of, when its own wireless base station is a master base station, setting the wireless parameter set that was determined in the determination procedure to the channels, and when its own wireless base station is not a master base station, setting the wireless parameter set that was acquired in the acquisition procedure to the channels.

Effect of the Invention

According to the present invention, each of the plurality of wireless base stations determines a wireless parameter set that is to be set to channels used for transmission of MBMS data and both sets the wireless parameter set that was determined to the channels and reports the wireless parameter set to other wireless base stations when its own wireless base station is the master base station.

In addition, each of the plurality of wireless base stations, when its own wireless base station is not the master base station, acquires a wireless parameter set that was reported from the master base station and sets the wireless parameter set that was acquired to channels.

Because each of a plurality of wireless base stations is therefore able to set the same wireless parameter set to channels, the present invention has the effect that a MBSFN cluster can be formed even in the absence of a radio network controller (RNC).

BEST MODE FOR CARRYING OUT THE INVENTION

Exemplary embodiments of the present invention are next described with reference to the accompanying drawings.

In the exemplary embodiments described hereinbelow, examples are described in which the present invention is applied to a W-CDMA wireless communication system that uses a plurality of femto wireless base stations (HNB).

First Exemplary Embodiment

Figure 1:
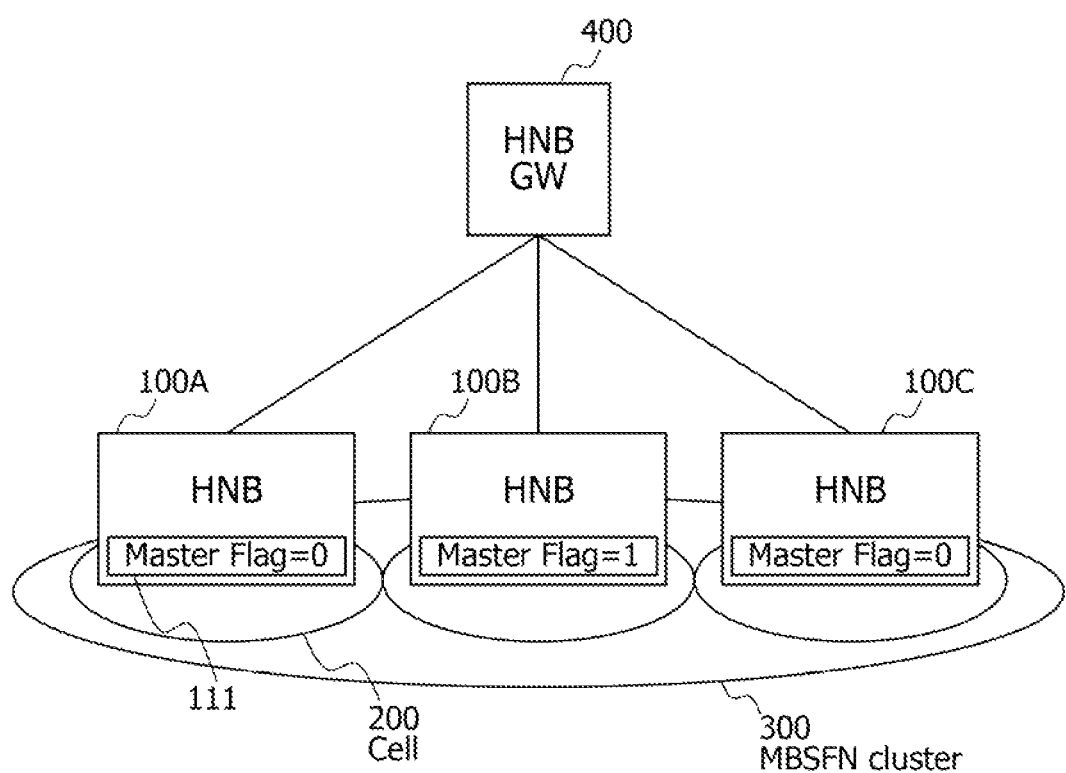
FIG. 1 shows the composition of a wireless communication system of the present invention.

Referring to FIG. 1, the wireless communication system of the present exemplary embodiment includes: femto wireless base stations 100A, 100B, and 100C; and HNB GW (HNB Gateway) 400 that is connected to femto wireless base stations 100A, 100B, and 100C by way of, for example, the Internet.

Femto wireless base stations 100A, 100B, and 100C each form cells 200 and transmit MBMS data to mobile stations (not shown) in cells 200 of its own station.

At this time, femto wireless base stations 100A, 100B, and 100C are able to form MBSFN cluster 300 that straddles femto wireless base stations 100A, 100B, and 100C by setting the same wireless parameter set (such as frequency, scrambling code, a channelization code, slot format, and TFS (Transport Format Set)) in channels to be used for the transmission of MBMS data and then transmitting the same MBMS data to mobile stations.

In the present exemplary embodiment, each of femto wireless base stations 100A, 100B, and 100C stores master flags 111 that indicate whether its own femto wireless base station is a master or a slave.

Master flag 111 is set to "1" for only one femto wireless base station 100B, and the master flags 111 for the other femto wireless base stations 100A and 100C are set to "0." In other words, femto wireless base station 100B behaves as the master femto wireless base station and the other femto wireless base stations 100A and 100C behave as slave femto wireless base stations.

MBSFN cluster 300 is then formed by femto wireless base station 100B determining a wireless parameter set and each of femto wireless base stations 100A, 100B, and 100C then setting this wireless parameter set in channels.

A detailed description of the configuration of femto wireless base stations 100A, 100B, and 100C of the present exemplary embodiment is next presented. Although the configuration of femto wireless base station 100A is here described with reference to FIG. 2, it is assumed that the other femto wireless base stations 100B and 100C are of the same configuration.

Figure 2:
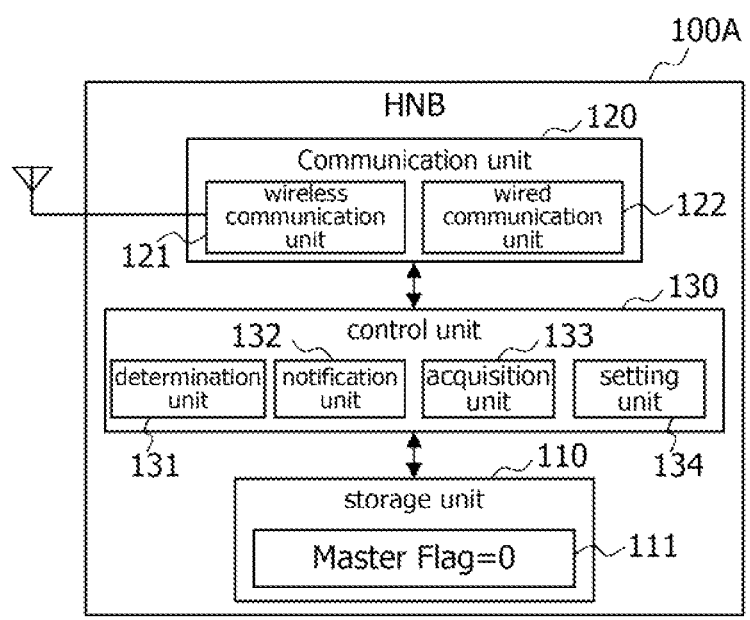
FIG. 2 is a block diagram showing the configuration of a femto wireless base station of the first exemplary embodiment of the present invention.

Referring to FIG. 2, femto wireless base station 100A of the present exemplary embodiment includes storage unit 110, communication unit 120, and control unit 130.

Storage unit 110 stores the above-described master flag 111. In this case, master flag 111 is set to "0."

Communication unit 120 includes wireless communication unit 121 that performs wireless communication with mobile stations in cell 200 of its own femto wireless base station or with the other femto wireless base stations 100B and 100C, and wired communication unit 122 that performs wired communication with HNB GW 400 or other femto wireless base stations 100B and 100C.

Control unit 130 includes determination unit 131, notification unit 132, acquisition unit 133, and setting unit 134.

Determination unit 131 determines the wireless parameter set that is to be set to channels that are used for transmission of MBMS data when its own femto wireless base station is the master femto base station, i.e., when master flag 111 is set to "1."

Notification unit 132 reports the wireless parameter set that was determined in determination unit 131 to other femto wireless base stations 100B and 100C by way of communication unit 120 when its own femto wireless base station is the master femto base station 100.

Acquisition unit 133 acquires a wireless parameter set that was reported from the master femto base station when its own femto wireless base station is not the master femto base station, i.e., when master flag 111 is set to "0."

Setting unit 134 sets the wireless parameter set that was determined in determination unit 131 to channels when its own femto wireless base station is the master femto base station and sets the wireless parameter set that was acquired in acquisition unit 133 to channels when its own femto wireless base station is not the master femto base station.

The operations of the wireless communication system of the present exemplary embodiment are next described.

In femto wireless base station 100B that is the master femto wireless base station, determination unit 131 determines a wireless parameter set that is to be set to channels used for transmission of MBMS data upon receiving an MBMS start request from HNB GW 400 that is the higher-order node. Methods that can be considered as the method of determining the wireless parameter set include a method of selecting from within a database (not shown) that is held beforehand in femto wireless base station 100B or a method in which femto wireless base station 100B appropriately selects wireless parameters that can be used.

In femto wireless base station 100B, setting unit 134 next sets the wireless parameter set that was determined in determination unit 131 to channels, and notification unit 132 further includes, in report information, this wireless parameter set, the transmission timing and identifiers of the MBMS data that are to be transmitted using this wireless parameter set, and a setting date/time at which the wireless parameter set was set and transmits the report information.

In femto wireless base stations 100A and 100C that are slave femto wireless base stations, acquisition units 133 next acquire the wireless parameter set, transmission timing and identifiers of the MBMS data, and setting date/time of the wireless parameter set that were transmitted by the report information from the neighboring master femto wireless base station or from another slave femto wireless base station.

In femto wireless base stations 100A and 100C, if the setting date/time of the wireless parameter set that was acquired in acquisition units 133 is later than the setting date/time of the wireless parameter set that is set in channels at that time, setting units 134 set the wireless parameter set that was acquired in acquisition units 133 to the channels and notification units 132 further transmit report information that is the same as the report information that was transmitted from the neighboring master femto wireless base station or from other slave femto wireless base stations in cell 200 of its own femto wireless base station 100.

In other words, in femto wireless base stations 100A and 100C that are slave femto wireless base stations, the wireless parameter set that is transmitted by report information from a master femto wireless base station is acquired directly from the master femto wireless base station or indirectly by way of other slave femto wireless base stations.

As a result of the above-described operations, each of femto wireless base stations 100A, 100B, and 100C is able to set the same wireless parameter set to channels and MBSFN cluster 300 can therefore be formed even in the absence of a radio network controller (RNC).

Second Exemplary Embodiment

The overall configuration of the wireless communication system of the present exemplary embodiment is the same as that of the first exemplary embodiment.

Each of femto wireless base stations 100A, 100B, and 100C of the present exemplary embodiment is aware of a group to which its own femto wireless base station 100 belongs and forms MBSFN cluster 300 with other femto wireless base stations that belong to the same group as its own femto wireless base station.

A detailed description of the configuration of femto wireless base stations 100A, 100B, and 100C of the present exemplary embodiment is next presented. The configuration of femto wireless base station 100A is here described with reference to FIG. 3, and the other femto wireless base stations 100B and 100C are assumed to be of the same configuration.

Figure 3:
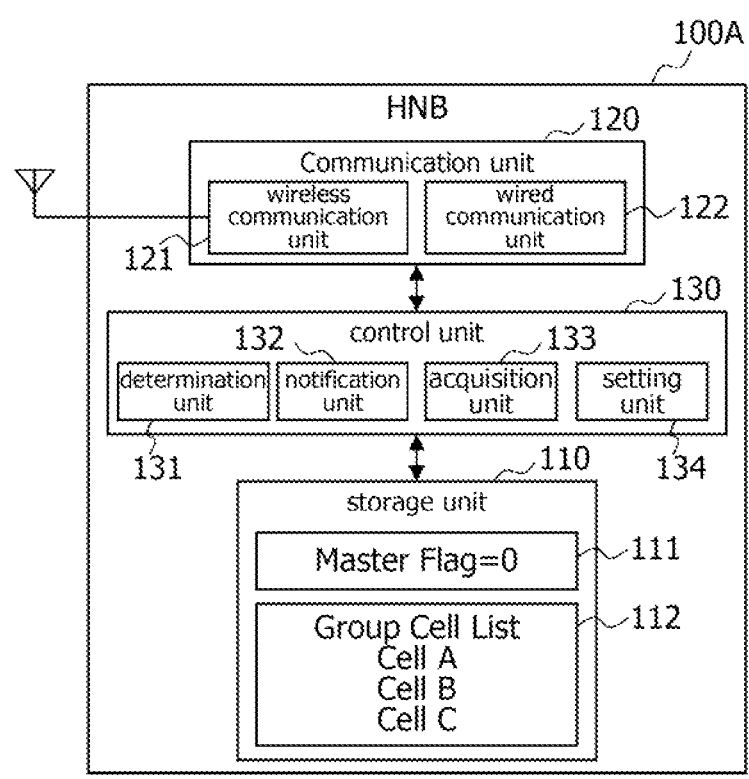
FIG. 3 is a block diagram showing the configuration of a femto wireless base station of the second exemplary embodiment of the present invention.

Referring to FIG. 3, femto wireless base station 100A of the present exemplary embodiment differs with respect to the configuration of FIG. 2 in that list 112 of the cell IDs of femto wireless base stations that belong to the same group as femto wireless base station 100A is stored in storage unit 110.

In this case, when its own femto base station is not a master femto base station, setting unit 134 monitors whether neighboring femto wireless base stations from which wireless parameter sets have been acquired in acquisition units 133 are femto wireless base stations that have cell IDs that are registered in list 112. Setting unit 134 then sets in channels a wireless parameter set that was acquired from a femto wireless base station that has a registered cell ID but ignores wireless parameter sets that were acquired from femto wireless base stations that have cell IDs that are not registered.

Report information was used as a method of reporting a wireless parameter set among femto wireless base stations 100A, 100B, and 100C in the first and second exemplary embodiments, but there is also a method of using an MCCH (Multicast Control Channel).

Still further, the method of reporting a wireless parameter set is not limited to methods of notification using, for example, report information or an MCCH, but also includes methods of notification by wired connection.

For example, there is also a method in which, if all femto wireless base stations 100A, 100B, and 100C are present under the same network address, the master femto wireless base station designates a MAC address (Media Access Control address) to report a wireless parameter set to necessary slave femto wireless base stations.

Alternatively, there is also a method in which, if femto wireless base stations 100A, 100B, and 100C are present under different network addresses, the master femto wireless base station designates an IP (Internet Protocol) address to report a wireless parameter set to necessary slave femto wireless base stations.

There is additionally a method in which a list is registered in HNB GW 400 based on which each of femto wireless base stations 100A, 100B, and 100C can be discerned to be a master or slave, the master femto wireless base station transfers the wireless parameter set that was determined to HNB GW 400, and HNB GW 400 reports the wireless parameter set to necessary slave femto wireless base stations.

Although the setting date/time of a wireless parameter set was used in the first and second exemplary embodiments to judge whether a wireless parameter set is new or old, a sequence number may be used in place of the setting date/ time, the value of the sequence number being increased to a new value each time the wireless parameter set is updated.

Although examples have been described in which the present invention is applied to a W-CDMA wireless communication system in the First and second exemplary embodiments, the present invention can also be applied to an LTE (Long Term Evolution) wireless communication system.

In this case, making the wireless parameter set of Resource Blocks for transmitting MBMS data uniform among wireless base stations (HeNB: Home evolved NodeB) enables the formation of an MBSFN cluster that straddles wireless base stations (HeNB).

Methods for making wireless parameter sets of Resource Blocks uniform include, for example, a method in which Resource Block Numbers are designated, a method in which the assigned time or the assigned frequency of MBMS data is designated, or a method in which the subcarrier number and symbol number that are assigned to MBMS data are designated.

The methods that are carried out in femto wireless base stations 100A, 100B, and 100C of the present invention may be applied to a program for execution by a computer. In addition, such a program can be stored on a recording medium and can be offered to the outside by way of a network.

Although the present invention has been described above with reference to exemplary embodiments, the present invention is not limited to the above-described exemplary embodiments. The construction and details of the present invention are open to various modifications within the scope of the present invention that will be understood by anyone of ordinary skill in the art.

This application claims the benefits of priority based on Japanese Patent Application No. 2009-109285 for which application was submitted on Apr. 28, 2009 and incorporates by citation all of the disclosures of that application.

What is claimed is:

1. A wireless communication system that includes a plurality of wireless base stations that transmit MBMS data to mobile stations within the cells of the wireless base stations, wherein each of said plurality of wireless base stations comprises:
    a storage unit that stores a flag that indicates whether or not its own wireless base station is a master base station;
    a determination unit that, when its own wireless base station is a master base station, determines a wireless parameter set that is set in channels to be used for transmission of MBMS data;
    a notification unit that, when its own wireless base station is a master base station, reports the wireless parameter set that was determined in said determination unit to other wireless base stations;
    an acquisition unit that, when its own wireless base station is not a master base station, acquires a wireless parameter set that was reported from a master base station; and
    a setting unit that, when its own wireless base station is a master base station, sets the wireless parameter set that was determined in said determination unit to said channels, and when its own wireless base station is not a master base station, sets the wireless parameter set that was acquired in said acquisition unit to said channels.

2. The wireless communication system as set forth in claim 1, wherein:
    said notification unit, when its own wireless base station is not a master base station, upon notification of a wireless parameter set from another wireless base stations including a master base station, further reports the wireless parameter set to other wireless base stations; and
    said acquisition unit, when its own wireless base station is not a master base station, acquires a wireless parameter set that is reported directly from a master base station or indirectly by way of another wireless base station.

3. The wireless communication system as set forth in claim 1, wherein:
    said notification unit reports a setting date/time of said wireless parameter set and said wireless parameter set; and
    said setting unit, when its own wireless base station is not a master base station, sets a wireless parameter set that was acquired in said acquisition unit in said channels when the setting date/time of the wireless parameter set that was acquired in said acquisition unit is later than the setting date/time of a wireless parameter set that is set in said channels at that time.

4. The wireless communication system as set forth in claim 1, wherein:
    said notification unit reports a sequence number of said wireless parameter set and said wireless parameter set; and
    said setting unit, when its own wireless base station is not a master base station, sets a wireless parameter set that was acquired in said acquisition unit in said channels when the sequence number of the wireless parameter set that was acquired in said acquisition unit is more recent than the sequence number of the wireless parameter set that is set in said channels at that time.

5. The wireless communication system as set forth in claim 1, wherein:
    said storage unit further stores a list of wireless base stations that belong to the same group as its own wireless base station; and
    said setting unit, when its own wireless base station is not a master base station, sets a wireless parameter set that was acquired in said acquisition unit in said channels if the wireless base station from which the wireless parameter set was acquired in said acquisition unit belongs to the same group as its own wireless base station.

6. A wireless base station that transmits MBMS data to mobile stations in the cell of said wireless base station and that comprises:
    a storage unit that stores a flag that indicates whether or not its own wireless base station is a master base station;
    a determination unit that, when its own wireless base station is a master base station, determines a wireless parameter set that is set in channels used for transmission of MBMS data;
    a notification unit that, when its own wireless base station is a master base station, reports the wireless parameter set that was determined in said determination unit to other wireless base stations;
    an acquisition unit that, when its own wireless base station is not a master base station, acquires a wireless parameter set that was reported from a master base station; and
    a setting unit that, when its own wireless base station is a master base station, sets the wireless parameter set that was determined in said determination unit in said channels, and when its own wireless base station is not a master base station, sets the wireless parameter set that was acquired in said acquisition unit in said channels.

7. The wireless base station as set forth in claim 6, wherein:
    said notification unit, when its own wireless base station is not a master base station, upon notification of a wireless parameter set from another wireless base station including a master base station, further reports the wireless parameter set to other wireless base stations; and said acquisition unit, when its own wireless base station is not a master base station, acquires a wireless parameter set that is reported directly from a master base station or indirectly by way of another wireless base station.

8. The wireless base station as set forth in claim 6, wherein:

said notification unit reports a setting date/time of said wireless parameter set and said wireless parameter set; and said setting unit, when its own wireless base station is not a master base station, sets a wireless parameter set that was acquired in said acquisition unit in said channels when the setting date/time of the wireless parameter set that was acquired in said acquisition unit is later than the setting date/time of the wireless parameter set that is set in said channel at that time.

9. The wireless base station as set forth in claim 6, wherein:

said notification unit reports a sequence number of said wireless parameter set and said wireless parameter set; and said setting unit, when its own wireless base station is not a master base station, sets a wireless parameter set that was acquired in said acquisition unit in said channels when the sequence number of the wireless parameter set that was acquired in said acquisition unit is more recent than the sequence number of the wireless parameter set that is set in said channel at that time.

10. The wireless base station as set forth in claim 6, wherein:

said storage unit further stores a list of wireless base stations that belong to the same group as its own wireless base station; and said setting unit, when its own wireless base station is not a master base station, sets a wireless parameter set that was acquired in said acquisition unit in said channels if the wireless base station from which the wireless parameter set was acquired in said acquisition unit belongs to the same group as its own wireless base station.

11. A wireless communication method that is realized by a wireless base station that transmits MBMS data to mobile stations in the cell of its own wireless base station and that comprises:

a storage step of storing a flag that indicates whether or not its own wireless base station is a master base station;

a determination step of, when its own wireless base station is a master base station, determining a wireless parameter set that is set to channels used for transmission of MBMS data;

a notification step of, when its own wireless base station is a master base station, reporting a wireless parameter set that was determined in said determination step to other wireless base stations;

an acquisition step of, when its own wireless base station is not a master base station, acquiring a wireless parameter set that was reported from a master base station; and a setting step of, when its own wireless base station is a master base station, setting a wireless parameter set that was determined in said determination step in said channels, and when its own wireless base station is not a master base station, setting the wireless parameter set that was acquired in said acquisition step in said channels.

12. The wireless communication method as set forth in claim 11, wherein:

in said notification step, when its own wireless base station is not a master base station, upon notification of a wireless parameter set from another wireless base station including a master base station, further reporting the wireless parameter set to other wireless base stations; and in said acquisition step, when its own wireless base station is not a master base station, acquiring a wireless parameter set that is reported directly from a master base station or indirectly by way of another wireless base station.

13. The wireless communication method as set forth in claim 11, wherein:

in said notification step, reporting a setting date/time of said wireless parameter set and said wireless parameter set; and in said setting step, when its own wireless base station is not a master base station, setting a wireless parameter set that was acquired in said acquisition step in said channels when the setting date/time of the wireless parameter set that was acquired in said acquisition step is later than the setting date/time of a wireless parameter set that is set in said channels at that time.

14. The wireless communication method as set forth in claim 11, wherein:

in said notification step, reporting a sequence number of said wireless parameter set and said wireless parameter set; and in said setting step, when its own wireless base station is not a master base station, setting a wireless parameter set that was acquired in said acquisition step in said channels when the sequence number of the wireless parameter set that was acquired in said acquisition step is more recent than the sequence number of the wireless parameter set that is set in said channels at that time.

15. The wireless communication method as set forth in claim 11, wherein:

in said storage step, further storing a list of wireless base stations that belong to the same group as its own wireless base station; and in said setting step, when its own wireless base station is not a master base station, setting a wireless parameter set that was acquired in said acquisition step in said channels if the wireless base station from which the wireless parameter set was acquired in said acquisition step belongs to the same group as its own wireless base station.

* * * * *